United States Patent Office 3,444,940
Patented May 20, 1969

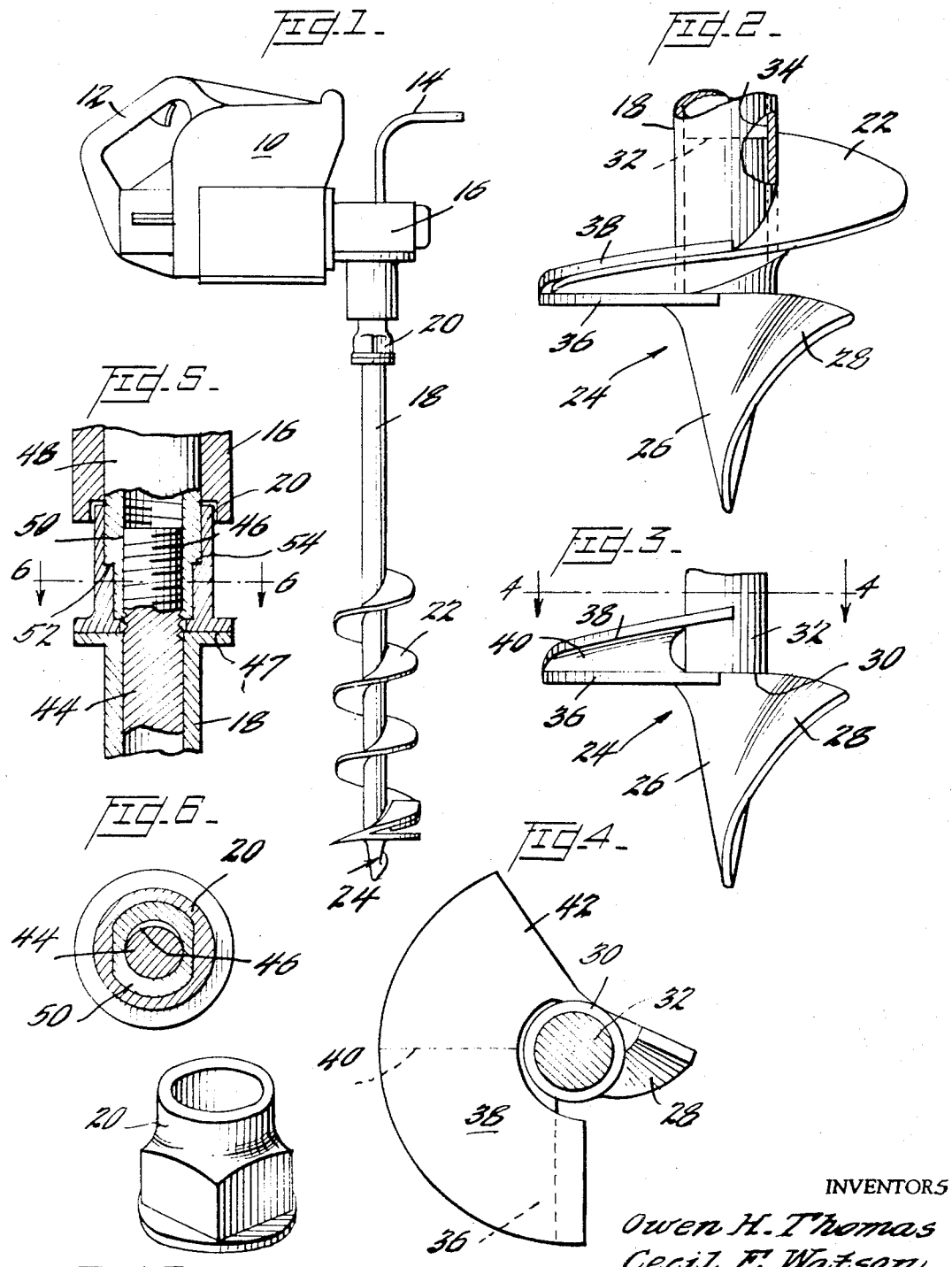

---

3,444,940
AUGER AND BIT THEREFOR
Owen H. Thomas and Cecil E. Watson, Medford, Ore., assignors to Southern Oregon Reforestation, Inc., Medford, Oreg., a corporation of Oregon
Filed Aug. 23, 1967, Ser. No. 662,791
Int. Cl. E21c *13/04*
U.S. Cl. 175—394                               10 Claims

ABSTRACT OF THE DISCLOSURE

The invention comprises an auger bit for an auger having a leading digging bit, a spiral cutting and deflecting fin formed laterally along the bit, and a split spiral blade having a leading cutting edge and an internal locking groove for receiving the leading end of the auger spiral flight. A rotary power source is provided for the auger, in threaded union with the auger shaft. A torque transmitting collar is inserted about the threaded union for transferring torque from the power source directly to the auger shaft, bypassing the threaded union.

Background of the invention

The invention presents a novel solution to the problems encountered in earth boring as it relates to reforestation planting, but is not particularly limited thereto. Subterranean roots, rocks and other debris cause auger bits to wear rather rapidly, and thus such bits must be replaced frequently. Usually, a single bit will last only a few hours, and therefore must be replaced at the work location. Desirably, the auger bit should have smooth work surfaces to prevent clogging of dirt and debris at the junction of the auger flight and bit, and yet be capable of replacement with a minimum of difficulty.

Several prior art devices present at least partial solutions to the problem. For example, U.S. Patent No. 2,890,860, issued to F. T. Smith, indicates a post-hole auger having a bit attached to the auger flight by simple bolts. U.S. Patent Nos. 2,634,104, issued to J. F. Clayton et al.; 2,709,573, issued to F. E. Reed; and 2,838,285, issued to O. N. Gredell, indicates similar structures. However, in each case, the presence of the bolted connection permits roots, root tendrils and other encountered debris to be caught in the auger, thereby fouling the bit and reducing the effectiveness of the ground drilling operation. Additionally, at least some simple tools are required to remove the bolts to replace a worn auger bit.

U.S. Patent 3,094,198, issued to A. G. Newbold, presents a partial solution by providing a segmented bit having a key for holding the parts of the bit together on the end of the auger shaft. But a tool of some sort is required to remove and replace the key. Additionally, in the case of a bolted or keyed connection of the auger bit to its shaft, such small parts may be easily lost during changing of the bit at the work location, thereby rendering the auger useless until the lost parts can be replaced.

The present invention overcomes these disadvantages by providing a single, one piece auger bit which is secured in place or removed without aid of a single tool. Additionally, the shaft of the auger is provided with a torque transmitting collar which serves to strengthen the union of the auger and its rotating power source.

Brief description of the drawings

Details of construction according to the preferred embodiment of the invention will become readily apparent by reference to the following drawings wherein:

FIGURE 1 is an elevational view of a portable power unit, and an auger shaft and bit constructed according to the invention;

FIGURE 2 is an enlarged, elevational view of the auger bit of the invention secured to the auger;

FIGURE 3 is an elevational view of the auger bit;

FIGURE 4 is a sectional view taken along lines 4—4 of FIGURE 3;

FIGURE 5 is a partial internal view of the threaded union of the auger shaft and power source;

FIGURE 6 is a sectional view taken along lines 6—6 of FIGURE 5; and

FIGURE 7 is a perspective view of the novel torque transmitting collar.

Description of the preferred embodiment

Referring now to the drawings by reference character, FIGURE 1 illustrates a complete powered ground drilling apparatus employing the instant invention, which comprises a portable power unit 10, with hand grips 12 and 14, a gear transmission unit 16, an auger shaft 18 with novel torque transmission collar 20 inserted between gear unit 16 and shaft 18, a spiral auger flight 22 and the novel auger bit 24. Power unit 10 may be a conventional internal combustion chain-saw power unit, gear transmission 16 being a conventional gear reduction unit for ground drilling purposes. These assemblies are conventional, and form no part of the instant invention.

As shown in FIGURES 2 through 4, novel auger bit 24 includes a lower, digging or starter tip 26 of inverse conical form having an upwardly spiral cutting and deflecting fin 28 formed therealong. The fin 28 serves to deflect to sever rocks, root tendrils and other debris encountered in a ground drilling operation, thereby reducing the possibility of their contact with auger flight 22, and eliminating any unnecessary wear of working parts.

The upper end of tip 26 terminates in a radial seat 30, which serves to receive the lower terminal edge of auger shaft 18. Augar bit 24 is stabilized with respect to shaft 18 by means of a cylindrical anchor plug 32, formed on and extending upwardly from tip 26, and snugly received within mating bore 34 of shaft 18.

The remainder of novel bit 24 includes a unique split spiral blade assembly comprising a lower horizontally disposed stabilizer plate 36, formed about a portion of the upper edge of tip 26 (FIGURE 3), and an upper helical blade segment 38 which has substantially the same pitch as auger flight 22 (FIGURE 2). The internal junction of plate 36 and blade 38 forms a groove 40 which serves to receive the lower, leading end of auger flight 22 in abutting relationship. The external junction of plate 36 and blade 38 forms a radial extending leading edge 42, which may be sharpened for cutting ease. It will be noted that novel auger bit 24 may be easily attached by mere insertion of plug 32 into bore 34, together with a twist motion of bit 24 in the direction of the thread of auger flight 22, to secure the bit in place. Removal of bit 24 for replacement is accomplished in reverse, without need of any tools, simple or specialized. Being of unitary construction, bit 24 includes no small parts that can be lost at the work location.

FIGURES 5 through 7 show the novel torque absorbing and transmitting collar 20 of the invention, which serves to prolong the life of auger shaft 18. The upper end of shaft 18 includes a stud 44 of cylindrical configuration, threaded at 46, and welded within or otherwise suitably secured to auger shaft 18. The upper terminal edge of shaft 18 is formed into a seat or flange 47 for collar 20.

Gear transmission 16 transmits rotational power through a depending clutch 48, internally threaded at 48 to accommodate stud 44. Clutch 48 is provided with opposed external shoulders 52, 52, and collar 20 is formed with a pair of internal mating abutments 54, 54 for shoulders 52, 52. Thus, upon axial approach of clutch 48 to auger shaft 18 by the threaded union of stud 44 and clutch 48, shoulders 52, 52 engage abutments 54, 54 thereby compressing collar 20 between clutch 50 and seat 47 on shaft 18. Torque from power unit 10 will be transmitted partially through collar 20 to shaft 18, and partially through stud 44 to shaft 18, thereby reducing the tendency of stud 44 to weaken and shear from shaft 18. Collar 20 also prevents excessive tightening of the threaded union of stud 44 within clutch 48, thus making removal of shaft 18 from power unit 10 relatively easy. As indicated in FIGURE 7, the lower, circumferential edge of collar 20 is squared to receive a wrench for assisting the removal of shaft 18 from clutch 48.

It is readily apparent from the foregoing that we have invented a new and highly useful device in the art of auger assemblies, and therefore, we are not to be limited to the exact construction as hereinbefore provided, except as may be deemed to be within the scope of the following claims.

We claim:

1. An auger bit for use with an auger having a shaft, at least one spiral flight extending about the shaft, said flight having a leading end terminating on a side of the shaft, said leading end extending generally radially outwardly from said shaft, and means defining a bore within the lower terminal end of said shaft, said auger bit comprising a leading, digging point, an upper anchor plug insertable into said bore, and a split spiral blade forming a helical extension of said spiral flight, said spiral flight leading end insertable into said split spiral blade in engaging relation thereto when said auger is rotated in the direction of the thread of said spiral flight, and a leading edge on said split spiral blade.

2. The invention of claim 1 wherein said digging point includes an inverse conical plug, and a spiral deflecting and cutting fin formed along said conical plug.

3. The invention of claim 2 wherein said fin has an upper terminus disposed substantially opposite the leading edge of said split spiral blade.

4. The invention of claim 1 wherein said anchor plug is provided with a peripheral seat for receiving said auger shaft.

5. The invention of claim 1 wherein said split spiral blade comprises a substantially horizontally disposed stabilizer plate formed on the auger bit at the junction of said digging point and anchor plug, and an upper cooperating blade segment, arranged to overlie a lower terminal portion of and having the same general pitch as said stabilizer plate and locking blade forming a groove for said spiral flight leading edge, the external junction of said stabilizer plate and cooperating blade forming said split spiral blade leading edge.

6. The invention of claim 1 wherein said split spiral blade leading edge is sharpened to form a cutting edge.

7. The invention of claim 1 wherein said auger shaft includes a rotatable power source, an internally threaded clutch on said power source, a threaded lock stud extending upwardly from the auger shaft and received in said clutch, and a torque transmitting collar inserted between said clutch and auger shaft for transferring torque from said power source to said auger shaft, about said lock stud and clutch.

8. In an auger assembly including a rotating power source, an auger shaft, an internally threaded clutch on said power source, and an externally threaded locking stud of reduced diameter on said shaft and received in said clutch, means transmitting torque from said power source to said shaft about said lock stud comprising a collar compressed between said clutch and shaft by the threaded union of said clutch and lock stud.

9. The invention of claim 8 wherein said collar is spaced from said lock stud, said clutch insertable between the lock stud and collar.

10. The invention of claim 9 wherein said clutch includes an externally formed shoulder, said collor including internally formed, mating abutment means for said shoulder, and a peripheral seat for the collar formed on said auger shaft, about the junction of said lock stud and auger shaft whereby torque is transmitted from said power source through said shoulder and abutment means to the peripheral seat of said auger shaft.

References Cited

UNITED STATES PATENTS

| 1,522,368 | 1/1925 | Hoke | 175—394 X |
| 2,278,137 | 3/1942 | Overholt | 175—394 X |
| 2,838,285 | 6/1958 | Gredell | 175—394 X |
| 2,969,122 | 1/1961 | Steffes | 175—394 |
| 3,387,674 | 6/1968 | Watson | 175—394 |

NILES C. BYERS, JR., *Primary Examiner.*

PO-1050
(5/69)

UNITED STATES PATENT OFFICE
CERTIFICATE OF CORRECTION

Patent No. 3,444,940          Dated May 20, 1969

Inventor(s) Owen H. Thomas and Cecil E. Watson

It is certified that error appears in the above-identified patent and that said Letters Patent are hereby corrected as shown below:

Column 2, line 68, reference numeral "48" first occurrence, should read --50--. Column 3, line 3, reference numeral "50", should read --48--. Column 4, line 2, after "said" insert --one spiral flight, said--. Column 4, line 3, after "and" cancel "locking" and insert --cooperating--.

SIGNED AND
SEALED
JUN 2 1970

(SEAL)
Attest:

Edward M. Fletcher, Jr.          WILLIAM E. SCHUYLER, JR.
Attesting Officer          Commissioner of Patents